(12) United States Patent
Ono et al.

(10) Patent No.: US 8,575,298 B2
(45) Date of Patent: Nov. 5, 2013

(54) POLYETHER ETHER KETONE, AND METHOD FOR PURIFICATION OF POLYMER MATERIAL

(75) Inventors: Shigeki Ono, Osaka (JP); Takahisa Iwahara, Osaka (JP)

(73) Assignee: Kaneka Corporation, Osaka (JP)

( * ) Notice: Subject to any disclaimer, the term of this patent is extended or adjusted under 35 U.S.C. 154(b) by 288 days.

(21) Appl. No.: 12/740,659

(22) PCT Filed: Oct. 16, 2008

(86) PCT No.: PCT/JP2008/002926
§ 371 (c)(1),
(2), (4) Date: Aug. 4, 2010

(87) PCT Pub. No.: WO2009/057255
PCT Pub. Date: May 7, 2009

(65) Prior Publication Data
US 2011/0178237 A1    Jul. 21, 2011

(30) Foreign Application Priority Data

Oct. 31, 2007    (JP) .................. 2007-284322

(51) Int. Cl.
*C08G 4/00*    (2006.01)
*C08G 8/28*    (2006.01)

(52) U.S. Cl.
USPC ........................................ 528/220; 528/425

(58) Field of Classification Search
USPC ................................. 528/220, 425
See application file for complete search history.

(56) References Cited

U.S. PATENT DOCUMENTS

| | | |
|---|---|---|
| 4,176,222 A | 11/1979 | Cinderey et al. |
| 4,320,224 A | 3/1982 | Rose et al. |
| 4,711,945 A | 12/1987 | Daniels |
| 4,837,296 A | 6/1989 | Heinz et al. |
| 5,116,933 A | 5/1992 | Newton |

(Continued)

FOREIGN PATENT DOCUMENTS

| | | |
|---|---|---|
| CN | 1817927 A | 8/2006 |
| EP | 0 211 693 A1 | 2/1987 |

(Continued)

OTHER PUBLICATIONS

Extended European Search Report issued in counterpart European Application No. 08843453.5 dated May 25, 2012.

(Continued)

*Primary Examiner* — Duc Truong
(74) *Attorney, Agent, or Firm* — Sughrue Mion, PLLC

(57) ABSTRACT

A polyether ether ketone that is superior in mold flow performance, mechanical physical properties, and thermal stability is provided. A polyether ether ketone having a repeating unit represented by the formula: —Ar—C(=O)—Ar—O—Ar'—O— (wherein, Ar and Ar' represent a substituted or unsubstituted phenylene group), the polyether ether ketone including: (A) a polymerization component having a molecular weight of not lower than 5,000 and lower than 2,000,000; and (B) a polymerization component having a molecular weight of not lower than 1,000 and lower than 5,000, wherein: the weight ratio of (A):(B) is 60:40 to 97:3; the content of (C) a polymerization component having a molecular weight of not lower than 100 and lower than 1,000 is from 0 and less than 0.2% by weight based on the total weight of the component (A), the component (B) and the component (C); and the polyether ether ketone exhibits a multimodal molecular weight distribution with a maximum peak molecular weight falling within the range of not lower than 5,000 and lower than 2,000,000.

4 Claims, 7 Drawing Sheets

(56) References Cited

U.S. PATENT DOCUMENTS

| | | |
|---|---|---|
| 2005/0004340 A1 | 1/2005 | Devine et al. |
| 2005/0085597 A1 | 4/2005 | Toriida et al. |
| 2007/0265415 A1 | 11/2007 | Richter et al. |

FOREIGN PATENT DOCUMENTS

| | | |
|---|---|---|
| EP | 0 275 035 A2 | 7/1988 |
| EP | 2 000 493 A1 | 12/2008 |
| JP | 59-93724 A | 5/1984 |
| JP | 02-058535 A | 2/1990 |
| JP | 10-007898 A | 1/1998 |
| JP | 10-338745 A | 12/1998 |
| JP | 2004-526859 A | 9/2004 |
| JP | 2007-302895 A | 11/2007 |
| JP | 2008-38136 A | 2/2008 |
| WO | 02/096974 A2 | 12/2002 |
| WO | 03/050163 A1 | 6/2003 |

OTHER PUBLICATIONS

Japanese Office Action issued in Application No. 2009-538911 dated Jul. 16, 2013.

POLYETHER ETHER KETONE, AND METHOD FOR PURIFICATION OF POLYMER MATERIAL

TECHNICAL FIELD

The present invention relates to a polyether ether ketone having a certain molecular weight composition, a resin composition containing the same, a method for the production of the same, and a method for the purification of a polymer material such as said polymer.

BACKGROUND ART

Polyether ether ketone is a thermoplastic resin having extremely high heat resistance, and further is a type of a super engineering plastic that is excellent in chemical resistance and flame retardance, and significant mechanical strength and dimension stability. The polymer has bee used in applications for automobile parts taking advantage of these excellent characteristics, and in particular, utilization as materials that substitute for metal engine parts has been known in attempts to improve performances of engine parts and to reduce weight. Moreover, utilization in insulating coating of electric wires, electric/electronic associated parts, lead free solder materials, as well as in production lines of parts in electronic circuit substrates, chemicals, solvents and corrosive gas has been also known.

A variety of methods for production of the polymer have been known, and as a method for industrial production, a method in which a nucleophilic substitution reaction of hydroquinone is allowed with benzophenone having a halogen group such as fluorine at both ends in the presence of a base to permit polymerization is the most common method. In such a method, use of diphenyl sulfone as a polymerization solvent has been well known in order to obtain polyether ether ketone having favorable properties. In this respect, Patent Documents 1 to 4 and the like may be referred to. At present, polyether ether ketone has been commercially available mainly from Victrex plc under a trade name of PEEK; however these commercial products are also produced using diphenyl sulfone as a polymerization solvent according to the disclosure of the aforementioned documents.

However, the commercially available polyether ether ketone has been known to be inferior in mold flow performance. For conveniently producing a molded product having a complicated shape by injection molding, superior mold flow performance, i.e., low melt viscosity is demanded. Lowering of the molecular weight of polyether ether ketone leads to decrease in melt viscosity, but mechanical physical properties of the molded product are deteriorated; therefore, achievement of both superior mold flow performance and mechanical physical properties has been difficult.

On the other hand, Patent Document 6 discloses a method for the production of polyether ether ketone using sulfolane as a polymerization solvent. In this document, the mold flow performance of the polyether ether ketone obtained in this manner is unclear although MI value is disclosed, since the measurement conditions are not sufficient.

Meanwhile, since diphenyl sulfone is insoluble in water and has a high boiling point (379° C.), a separation step of diphenyl sulfone using an organic solvent, and a purification step with water have been necessary in order to separate the polymer from diphenyl sulfone after the polymerization and to remove inorganic salts in the polymer. Particularly, with respect to the separation step with an organic solvent, for example, Patent Document 5 discloses a method of removing inorganic salts and diphenyl sulfone, as a solvent, using acetone (twice), water (three times), acetone/ethanol (twice) serially. Thus, separation of the resin takes long time, and results in increase in production costs since a large amount of organic solvents must be consumed.

In addition, even if such complicated separation steps, and a purification step with water are carried out, it was impossible to avoid contamination of the product resin with as an impurity an alkali metal ion derived from a base used in polymerization reaction. As a consequence, applications have been restricted for use involving electric/electronic associated parts for which highly pure articles are particularly demanded.

Patent Document 7 discloses a method for the purification using liquid water with high pressure (for example, $6.0 \times 10^6$ Pa) and high temperature (for example, 260° C.). According to this method, the amount of impurities including an alkali metal ion in the obtained resin is reduced; however, a special pressure resistant apparatus is required for practice of this method, leading to necessity of large facilities, which accounts for increase in production costs.

Patent Document 1: U.S. Pat. No. 4,176,222
Patent Document 2: U.S. Pat. No. 4,320,224
Patent Document 3: U.S. Pat. No. 4,711,945
Patent Document 4: U.S. Pat. No. 5,116,933
Patent Document 5: JP-A No. S59-93724
Patent Document 6: Chinese Patent Application Publication No. 1,817,927
Patent Document 7: JP-T No. 2004-526859 (Japanese Translation of PCT International Publication)

DISCLOSURE OF THE INVENTION

Problems to be Solved by the Invention

As a consequence of investigations by the present inventors, the following disadvantages of conventional polyether ether ketone polymers were proven.

(1) The polyether ether ketone obtained by polymerization in diphenyl sulfone which has been known as a good polymerization solvent of polyether ether ketone has inferior mold flow performance, and thus convenient production of a molded product having a complicated shape by injection molding was difficult.

(2) When lowering the molecular weight for the purpose of improving the mold flow performance of the polyether ether ketone obtained by polymerization in the diphenyl sulfone, attaining sufficient mechanical physical properties failed in the molded product.

(3) Although the polyether ether ketone obtained using sulfone as a polymerization solvent has mechanical physical properties comparative to the polyether ether ketone obtained by polymerization in the diphenyl sulfone described above, a problem of occurrence of powdery substances on the surface of the molded product was proven when the molded product is allowed to stand under a high temperature of approximately 200° C., suggesting problems of thermal stability.

Thus, in view of the foregoing circumstances, an object of a first aspect of the present invention is to provide a polyether ether ketone that is superior in mold flow performance, mechanical physical properties, and thermal stability.

On the other hand, purification of polymer materials typified by polyether ether ketone has involved the following disadvantages.

(1) Since diphenyl sulfone known as the most suitable polymerization solvent of polyether ether ketones is insoluble in water and has a high boiling point (379° C.), in order to separate the resin from diphenyl sulfone after polymerization of the monomer used as a source of the polymer material to remove inorganic salts yielded as by-products in the resin, a separation step of diphenyl sulfone using an organic solvent, and purification step with water are required. Particularly, in the separation step with an organic solvent, it is necessary to repeat extraction process using, for example, acetone or ethanol many times to completely remove the solvent diphenyl sulfone. Thus, separation of the resin takes a long time, and a large amount of organic solvents must be consumed, leading to increase in production costs of the polymer material.

(2) Even though the complicated separation step and the purification step with water are carried out as described above, it is impossible to avoid contamination of the product resin with alkali metal ions as impurities derived from the base used in the polymerization reaction. Due to this event, applications have been restricted for use involving electric/electronic associated parts for which highly pure articles are particularly demanded.

(3) Highly pure resins with reduced alkali metal ions are obtained by using water having a high pressure and a high temperature, and thus pressure resistant facilities are required, leading to necessity of large facilities, which accounts for increase in production costs.

Thus, in view of the foregoing circumstances, an object of a second aspect of the present invention is to provide a method for the purification capable of conveniently carrying out the purification step of the polymer material at low costs, and also capable of providing a polymer material having an extremely high purity.

Means for Solving the Problems

The present inventors found that a novel polyether ether ketone having a certain molecular weight composition is superior in mold flow performance, mechanical physical properties, and thermal stability.

Furthermore, the present inventors found a method capable of conveniently purifying a polymer material even under an ambient pressure by mixing a water soluble aprotonic solvent with the polymer material at a temperature of not lower than 100° C., and thereafter mixing the resulting mixture with a solvent essentially consisting of water without using water having a ultrahigh pressure and a high temperature, unexpectedly. In addition, it was also found that impurities such as alkali metal ions in a polymer material can be reduced extremely conveniently, and a polymer material having certain molecular weight composition described above can be obtained according to this method, and thus the present invention was accomplished.

More specifically, the first aspect of the present invention relates to a polyether ether ketone having a repeating unit represented by the following formula (1):

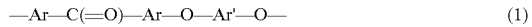

—Ar—C(=O)—Ar—O—Ar'—O—    (1)

wherein, Ar and Ar' may be the same or different, and represent a substituted or unsubstituted phenylene group, the polyether ether ketone including:

(A) a polymerization component having a molecular weight of not lower than 5,000 and lower than 2,000,000; and (B) a polymerization component having a molecular weight of not lower than 1,000 and lower than 5,000, wherein:

the weight ratio of (A):(B) is 60:40 to 97:3;

the content of (C) a polymerization component having a molecular weight of not lower than 100 and lower than 1,000 is from 0 and less than 0.2% by weight based on the total weight of the component (A), the component (B) and the component (C); and the polyether ether ketone exhibits a multimodal molecular weight distribution with a maximum peak molecular weight falling within the range of not lower than 5,000 and lower than 2,000,000.

In addition, the first aspect of the present invention also relates to a resin composition containing the polyether ether ketone, and a reinforcing filler.

The second aspect of the present invention relates to a method for the purification of a polymer material having (A) a phenyl moiety, (B) at least any one of a carbonyl moiety and a sulfone moiety, and (C) at least any one of an ether moiety and a thioether moiety, the method being characterized by including:

mixing the polymer material with a water soluble aprotonic solvent at a temperature of not lower than 100° C.; mixing the resulting mixture with a solvent essentially consisting of water; and thereafter separating the polymer material from the water soluble aprotonic solvent and the solvent essentially consisting of water.

Effects of the Invention

Since the polyether ether ketone according to the first aspect of the present invention is superior in mold flow performance, even a molded product having a complicated shape can be easily produced, and the produced molded product maintains favorable mechanical physical properties and superior thermal stability.

The second aspect of the present invention achieves the following effects.

(1) A polymer material having an extremely low content of impurities such as alkali metal ions can be obtained. This advantage is important in applications involving electric/electronic associated parts for which highly pure articles are particularly demanded.

(2) A polymer material having an extremely low content of impurities such as alkali metal ions can be obtained without using a water having an ultrahigh pressure and a high temperature, but using a water soluble aprotonic solvent and water under a pressure of lower than 10 atm. Therefore, concomitant with enabling reduction of the energy required for purification, necessity of special pressure resistant facilities is precluded, whereby the purification step can be carried out at low costs.

(3) A polyether ether ketone that is superior in the mold flow performance, mechanical physical properties, and thermal stability described above can be conveniently produced.

BEST MODE FOR CARRYING OUT THE INVENTION

Figure 1:
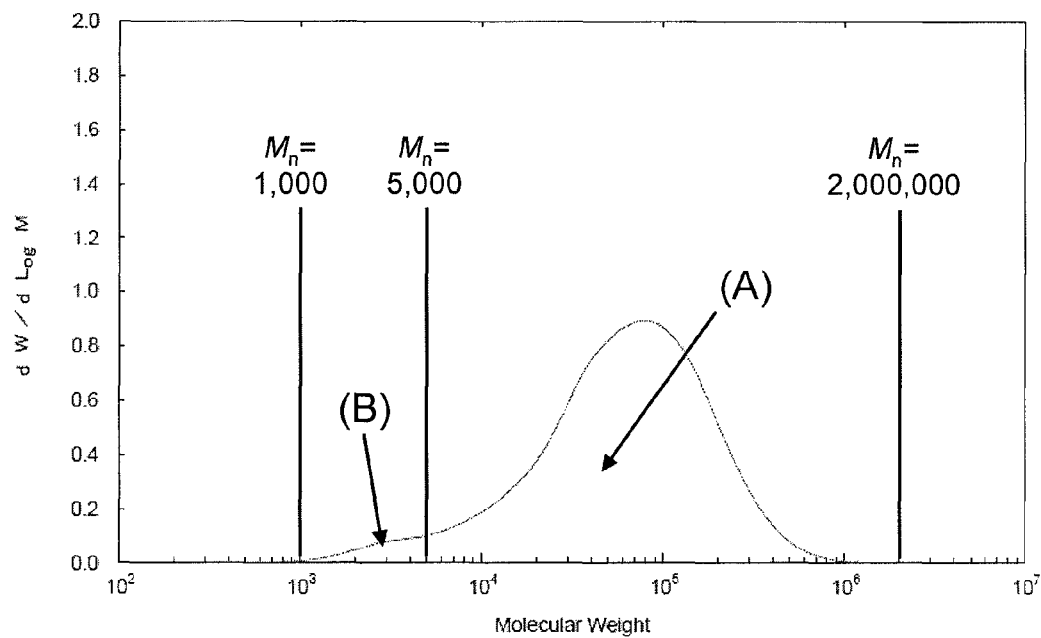
FIG. 1 shows a molecular weight distribution curve of the polyether ether ketone obtained in Example 1 (in the figure, the logarithm of the molecular weight is presented along the horizontal axis; and d (weight)/d (logarithm of the molecular weight) is presented along the longitudinal axis, with the plotting carried out such that the peak area is 1.0, and the same applies in the following figures)

First, the polyether ether ketone according to the first aspect of the present invention is explained.

A polyether ether ketone means a polymer having a repeating unit represented by the following formula (1):

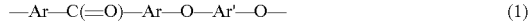

—Ar—C(=O)—Ar—O—Ar'—O—     (1)

wherein, Ar and Ar' may be the same or different, and represent a substituted or unsubstituted phenylene group.

Although the substituent on the phenyl ring in Ar and Ar' is not particularly limited, for example, an alkyl group having 1 to 10 carbon atoms, an aryl group having 6 to 10 carbon atoms, an aralkyl group having 7 to 10 carbon atoms, a halogen atom, and the like may be included. However, Ar and Ar' preferably represent an unsubstituted p-phenylene group.

The polyether ether ketone of the present invention may be either a homopolymer composed of one type of a repeating unit, or a copolymer composed of two or more types of repeating units. A homopolymer composed of one type of a repeating unit represented by the above formula (1) is preferred.

Alternatively, a copolymer composed of the repeating unit represented by the above formula (1), and a repeating unit other than this repeating unit is also acceptable. As the other repeating unit, for example, the following units may be exemplified:

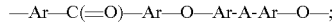

—Ar—C(=O)—Ar—O—Ar-A-Ar—O—;

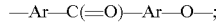

—Ar—C(=O)—Ar—O—;

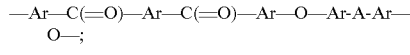

—Ar—C(=O)—Ar—C(=O)—Ar—O—Ar-A-Ar—O—;

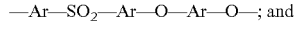

—Ar—SO$_2$—Ar—O—Ar—O—; and

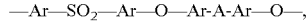

—Ar—SO$_2$—Ar—O—Ar-A-Ar—O—, wherein, Ar and A are as defined above.

By adjusting the component ratio of the monomer as a source material, the ends of the polymer may be provided with a halogen atom such as a fluorine atom, or a hydroxy group. In general, it is preferred that the fluorine atom be present at the polymer end. Also, by allowing the polymer end to react with an end-capping agent, the halogen end or the hydroxy group end may be substituted with an inactive substituent such as a phenyl group.

The polyether ether ketone in the first aspect of the present invention has a certain molecular weight composition. When the molecular weight composition of the polymer is divided into three components of (A) a polymerization component having a molecular weight of not lower than 5,000 and lower than 2,000,000 (B) a polymerization component having a molecular weight of not lower than 1,000 and lower than 5,000, and (C) a polymerization component having a molecular weight of not lower than 100 and lower than 1,000, the present polyether ether ketone is characterized by the weight ratio of the component (A):the component (B) being 60:40 to 97:3, and the content of the component (C) being 0 to 0.2% by weight based on the total weight of the component (A), the component (B) and the component (C). It should be noted that the polyether ether ketone in the present invention does not substantially contain a polymerization component having a molecular weight of not lower than 2,000,000; however, an extremely slight amount of the component may be observed around the molecular weight of the exclusion limit.

In the polyether ether ketone of the present invention, although the component (A) having a high molecular weight accounts for a major part of the molecular weight composition, the component (B) having a medium molecular weight is also present in a significant amount. The presence of this medium molecular weight component improves mold flow performance of the polyether ether ketone of the present invention as compared with those of conventional products. On the other hand, the polyether ether ketone currently available in the market such as Victrex 450 PF manufactured by Victrex plc has a weight ratio (A):(B) of 98:2 as demonstrated in Comparative Examples below, and is inferior in mold flow performance due to the low content of the component (B).

In the present invention, the weight ratio (A):(B) may be determined ad libitum within the range of 60:40 to 97:3 in light of the balance of necessary mold flow performance and mechanical physical properties. However, since mechanical physical properties tend to be deteriorated when the content of the component (B) is too high, the weight ratio (A):(B) is in the range of preferably 80:20 to 97:3, more preferably 90:10 to 97:3, and most preferably 95:5 to 97:3 in light of the improvement of the mold flow performance while maintaining the mechanical physical properties.

Furthermore, the polyether ether ketone of the present invention does not contain, or contains the component (C) having a molecular weight of not greater than 1,000 in an extremely slight amount of not greater than 0.2% by weight based on the total weight of the component (A), the component (B) and the component (C) (i.e., the total amount of the component (A) and the component (B) being not less than 98.8% by weight based on the total weight of the component (A), the component (B) and the component (C)). The low molecular weight component (C) involves in thermal stability of molded products, and when the content of the component (C) is not greater than 0.2% by weight, a phenomenon of generation of powdery substances on the surface of the molded product is not observed in the case in which the produced molded product is kept at a high temperature. The polyether ether ketone obtained using sulfolane as a polymerization solvent disclosed in Patent Document 6 contains the component (C) at a comparatively high concentration of not less than 0.4% by weight, and thus has the aforementioned drawbacks of generation of the powdery substance.

Since the component (C) is preferably as less as possible in the present invention, the content of the component (C) is more preferably not greater than 0.1% by weight, and most preferably 0.0% by weight based on the total weight of the component (A), the component (B) and the component (C).

Upon determination of the molecular weight composition described above, the molecular weight of the polyether ether ketone is determined using a gas permeation chromatography with polystyrene as a standard.

Figure 2:
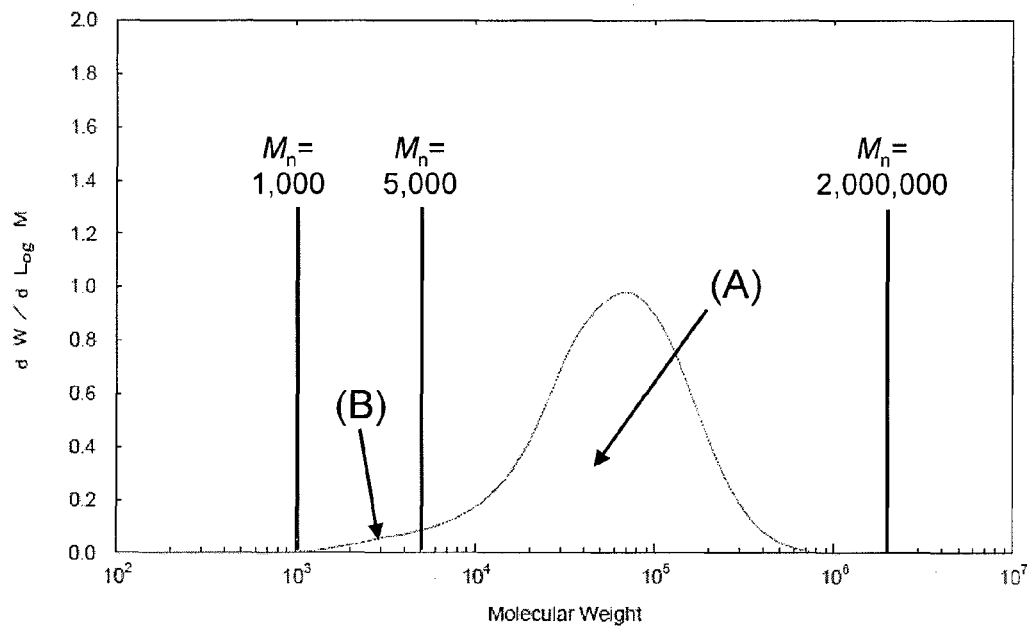
FIG. 2 shows a molecular weight distribution curve of the polyether ether ketone obtained in Example 2.
Figure 3:
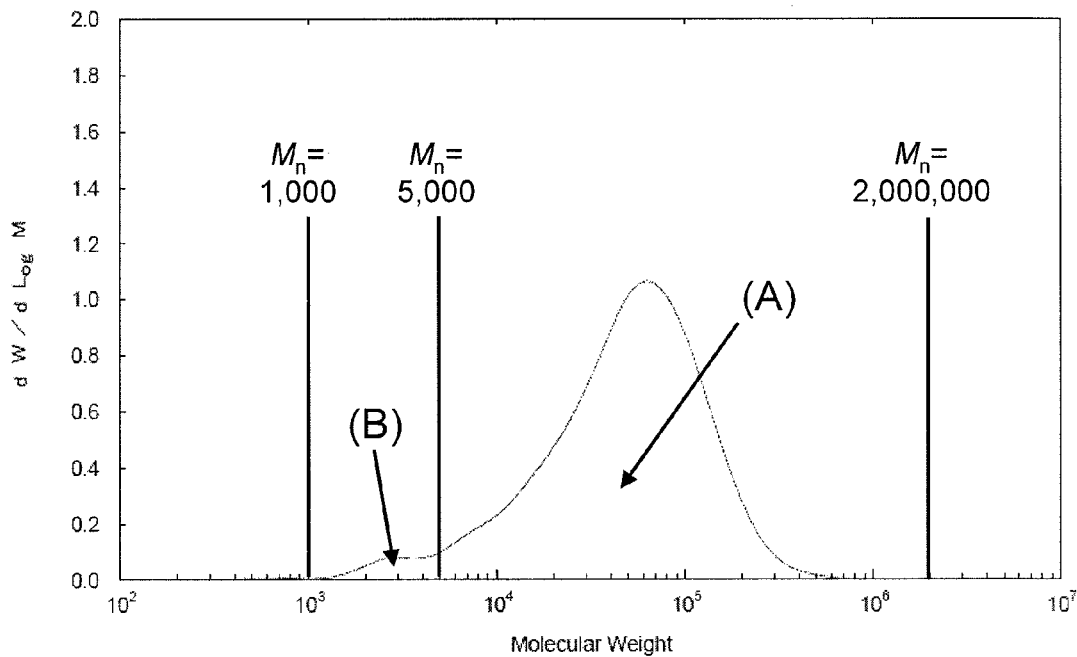
FIG. 3 shows a molecular weight distribution curve of the polyether ether ketone obtained in Example 3.
Figure 4:
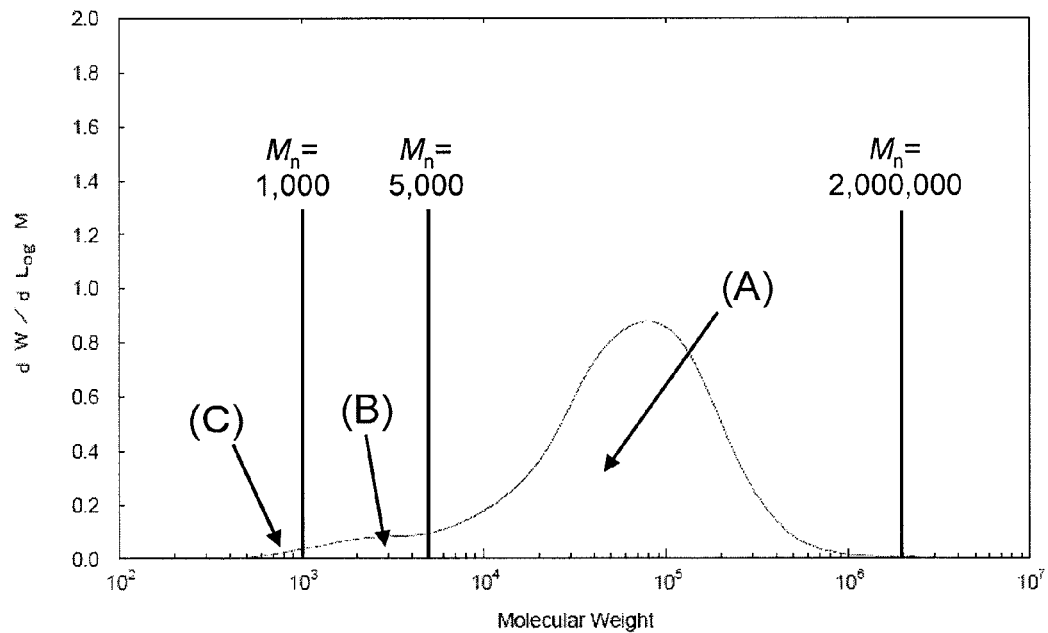
FIG. 4 shows a molecular weight distribution curve of the polyether ether ketone obtained in Comparative Example 1.
Figure 5:
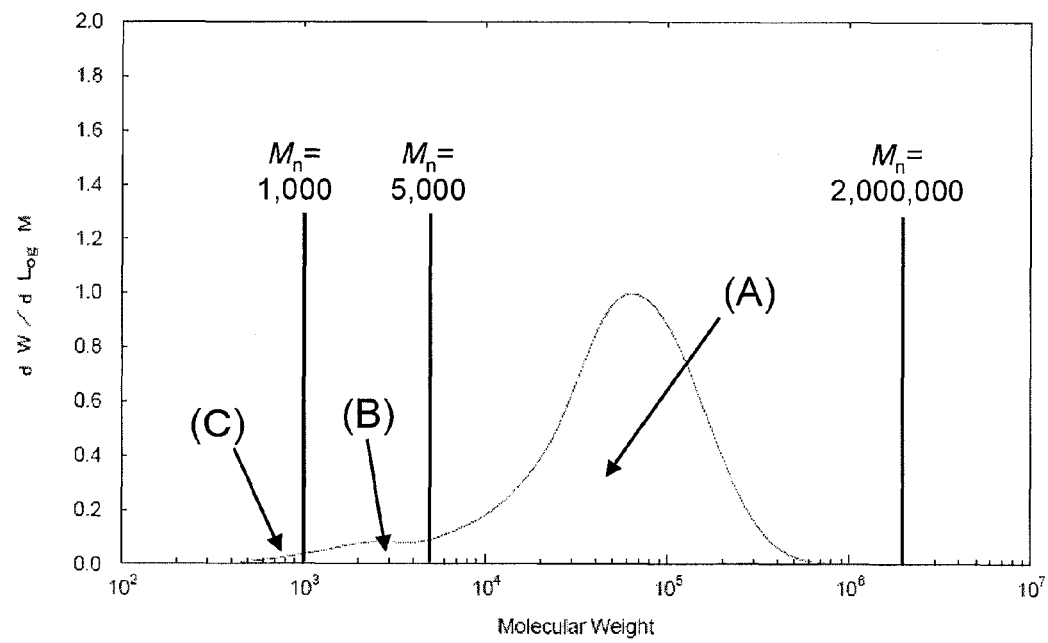
FIG. 5 shows a molecular weight distribution curve of the polyether ether ketone obtained in Comparative Example 2.
Figure 6:
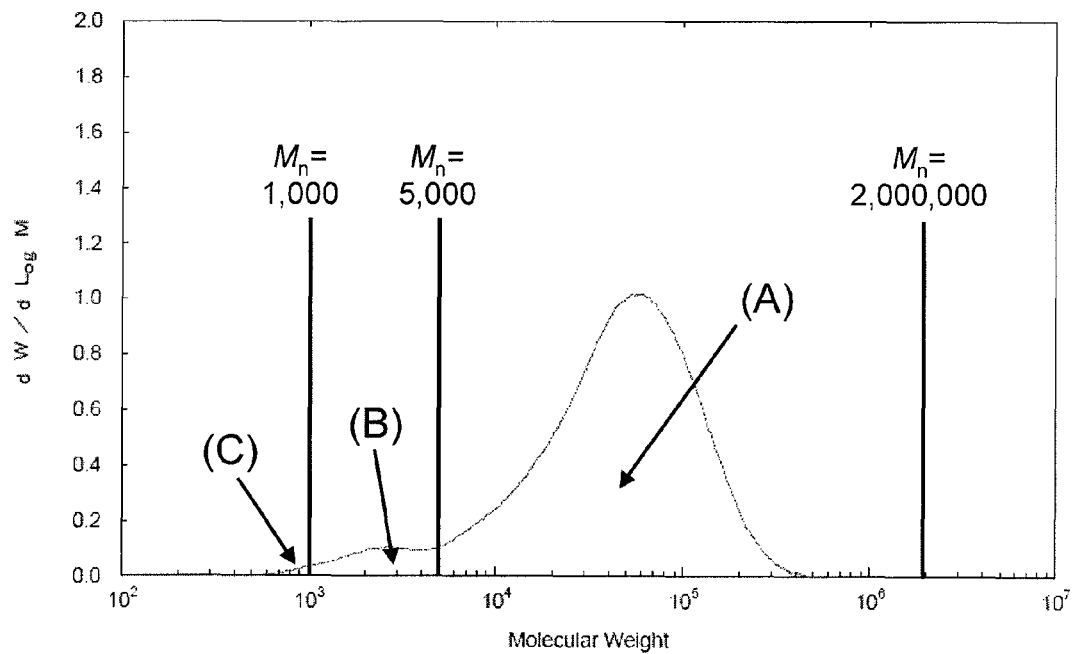
FIG. 6 shows a molecular weight distribution curve of the polyether ether ketone obtained in Comparative Example 3.
Figure 7:
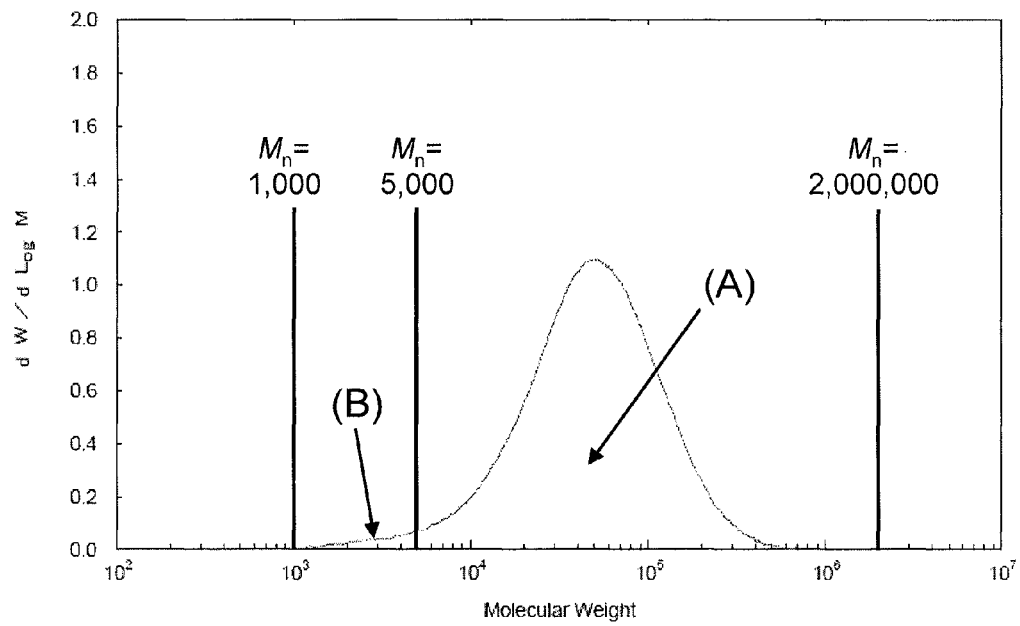
FIG. 7 shows a molecular weight distribution curve of the polyether ether ketone of Comparative Example 4.
Figure 8:
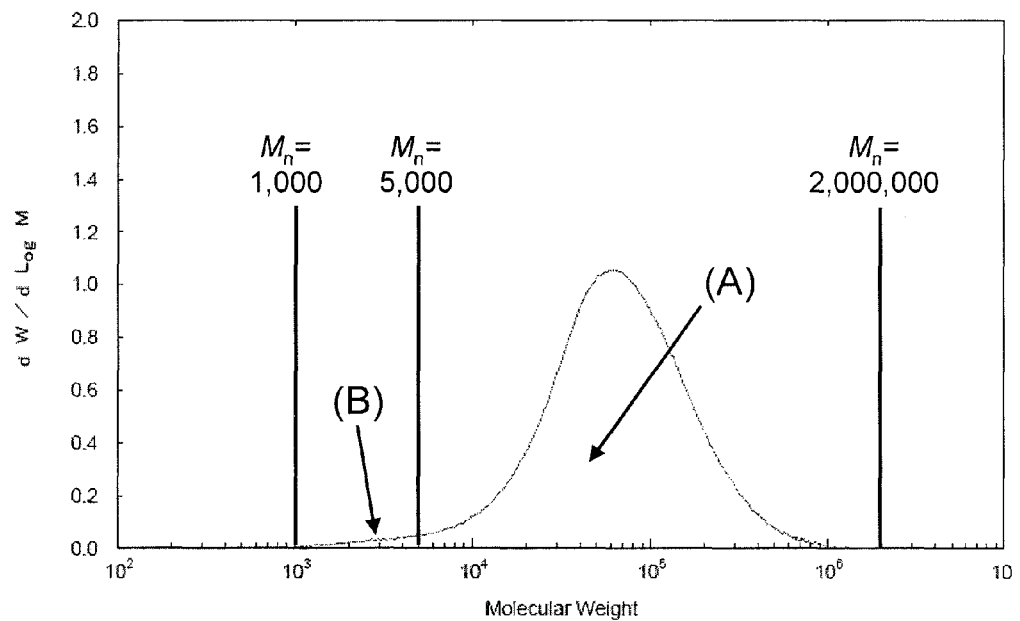
FIG. 8 shows a molecular weight distribution curve of the polyether ether ketone of Comparative Example 5.
Figure 9:
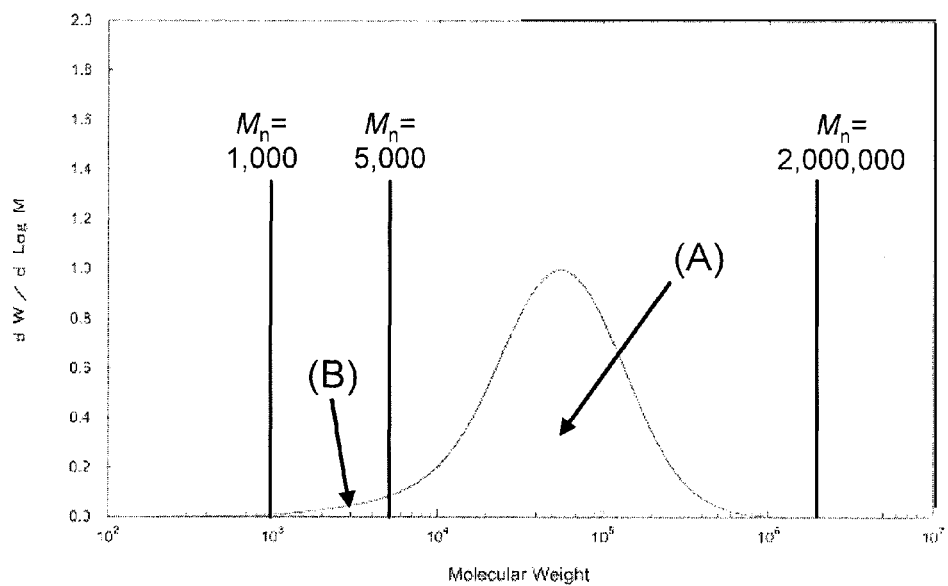
FIG. 9 shows a molecular weight distribution curve of the polyether ether ketone of Comparative Example 6.
Figure 10:
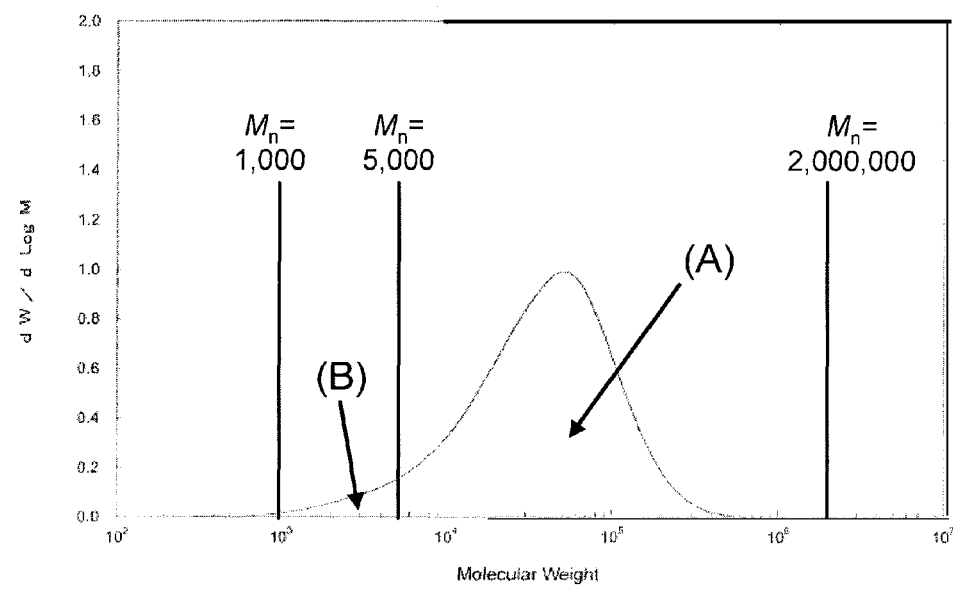
FIG. 10 shows a molecular weight distribution curve of the polyether ether ketone of Comparative Example 7.
Figure 11:
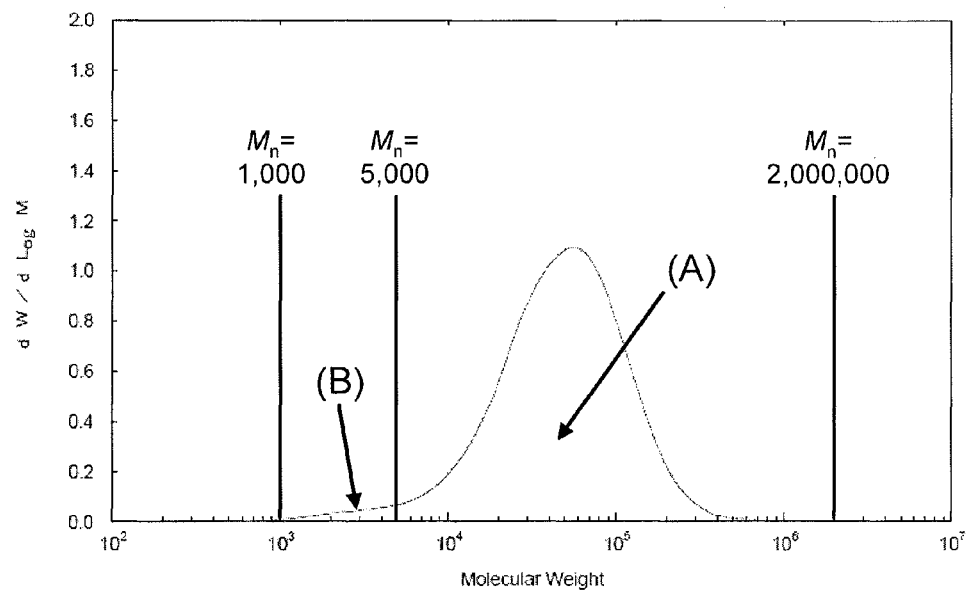
FIG. 11 shows a molecular weight distribution curve of the polyether ether ketone of Comparative Example 8.
Figure 12:
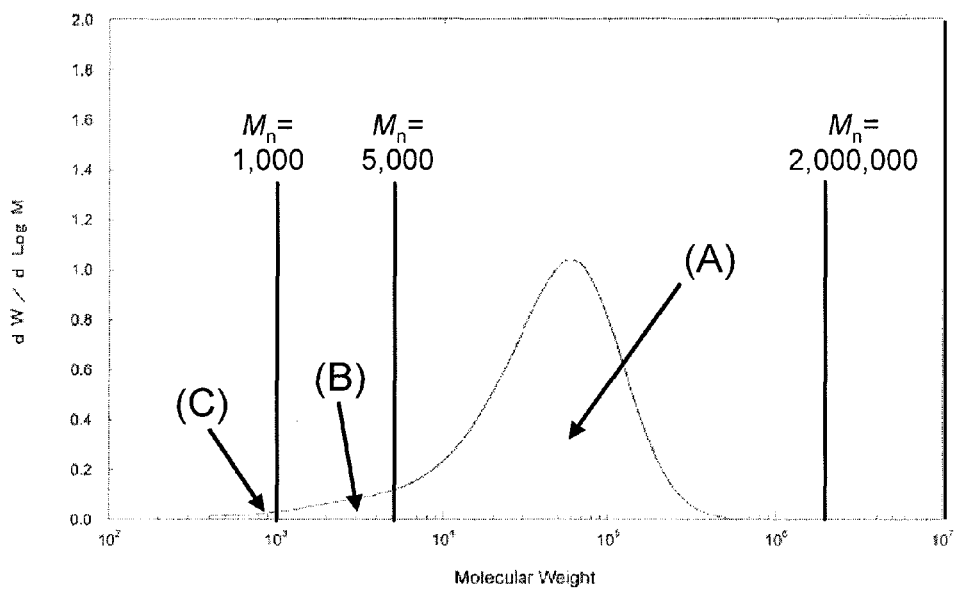
FIG. 12 shows a molecular weight distribution curve of the polyether ether ketone of Comparative Example 9.
Figure 13:
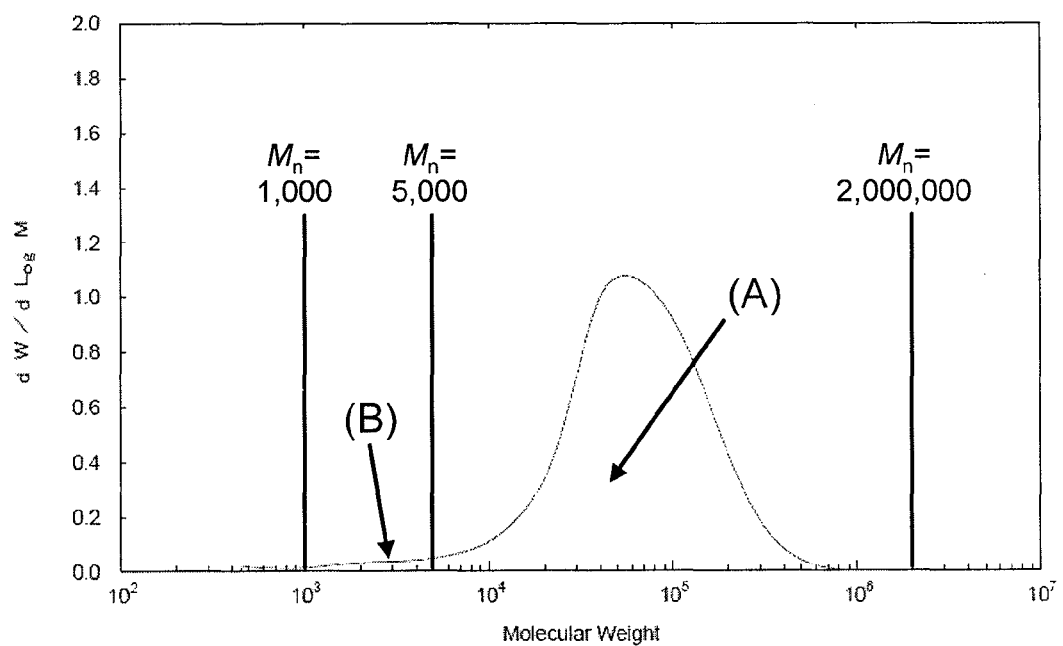
FIG. 13 shows a molecular weight distribution curve of the polyether ether ketone of Comparative Example 10.

The polyether ether ketone of the present invention exhibits a maximum peak molecular weight in a high molecular weight range of not lower than 5,000 and lower than 2,000,000. The maximum peak molecular weight referred to herein means, in a graph presenting a molecular weight distribution as shown in FIGS. 1 to 13, a molecular weight of which weight proportion is maximum in the entire polymer. Since the maximum peak molecular weight greatly affects the mechanical physical properties of the molded product, it may be determined ad libitum to meet physical properties desired, within the range of not lower than 5,000 and lower than 2,000,000, and the maximum peak molecular weight preferably exists within the range of 10,000 to 500,000, and most preferably within the range of 30,000 to 200,000. In this high molecular weight range, there may exist comparatively small peaks in addition to the maximum peak.

Moreover, the polyether ether ketone of the present invention exhibits a bimodal or further multimodal molecular weight distribution. In particular, it is preferred to exhibit a peak molecular weight that is lower than the maximum peak molecular weight, within the range of the medium molecular weight being not lower than 1,000 and lower than 5,000. The peak molecular weight is preferably the second highest molecular weight next to the maximum peak. When the peak molecular weight is within the range of the medium molecular weight in this manner, the weight ratio of the component (B) can be easily adjusted to be not less than 3% by weight. On the other hand, the commercially available product, polyether ether ketone manufactured by Victrex plc exhibits a unimodal molecular weight distribution, and does not exhibit a multimodal molecular weight distribution.

It is speculated that the range of the molecular weight being not lower than 1,000 and lower than 5,000 includes in addition to usual linear polymers, also cyclic polymers generated by binding of polymerizing ends. Formation of this cyclic polymer is presumed to result in increase in the content of the component (B) having a medium molecular weight of not lower than 1,000 and lower than 5,000 to generate a peak in this molecular weight range.

Since the number average molecular weight of the polyether ether ketone of the present invention greatly affects the mechanical physical properties of the molded product similarly to the maximum peak molecular weight described above, it may be determined ad libitum to meet desired physical properties, and preferably falls within the range of 10,000 to 50,000, and most preferably falls within the range of 15,000 to 40,000. The method of measuring the molecular weight is similar to the method described above.

The polyether ether ketone in the present invention preferably has an inherent viscosity of not less than 0.40 dL/g as measured on a solution in conc. sulfuric acid containing the polymer at a concentration of 0.1 g/dL in order to achieve satisfactory mechanical physical properties. The inherent viscosity is more preferably not less than 0.50 dL/g, still more preferably not less than 0.60 dL/g, and particularly preferably not less than 0.80 dL/g. The polyether ether ketone having a solution viscosity of less than 0.40 dL/g is fragile, and is thus not suited for use in applications of molding. When the solution viscosity exceeds 2.5 dL/g, inferior mold processability hampers practical use due to too high melt viscosity; therefore, the polyether ether ketone having a solution viscosity of not greater than 2.5 dL/g, and particularly 1.8 dL/g is preferred. The solution viscosity may be determined specifically, using Ubbelohde type viscometer, size No. 1C (capillary diameter: 0.77 mm) described in ISO1628-1: 1998, 5.1; or ISO3105: 1994, Table B4, at 25° C. by measuring efflux time on a 0.1 g/dL solution in 95% conc. sulfuric acid, and 95% conc. sulfuric acid, and substituting each resulting measurement into the following formula:

$$\text{solution viscosity } \eta i = \ln(t/t0)/c$$

wherein, t is efflux time (sec) of the solution in 95% conc. sulfuric acid;

t0 is efflux time (sec) of 95% conc. sulfuric acid; and c is the concentration of the solution, i.e., 0.1 g/dL.

The polyether ether ketone of the present invention can have a sodium cation concentration in the polyether ether ketone that reaches less than 25 ppm, suitably less than 20 ppm, preferably less than 15 ppm, more preferably less than 10 ppm, and particularly preferably less than 5 ppm, as described later.

In the present invention, a resin composition may be prepared by adding a reinforcing filler to the polyether ether ketone for the purpose of enhancing mechanical strength, heat resistance and the like. The reinforcing filler is not particularly limited, and any of organic filler and inorganic filler is acceptable as long as it strengthens a resin by blending with the resin. With respect to its shape, fibrous form fillers typified by glass fiber, carbon fiber and a variety of milled fiber, spherical fillers typified by calcium carbonate, boron nitride, silica, glass beads and ceramic powders, placoid fillers typified by talc, mica and glass flakes, nanosize fillers typified by organificated clays and carbon nanotubes, and the like can be arbitrarily used.

When the reinforcing filler is added, the amount of addition is preferably 10 to 250 parts by weight, more preferably 30 to 210 parts by weight, and even more preferably 60 to 180 parts by weight based on 100 parts by weight of the polyether ether ketone. The amount of addition being less than 10 parts by weight provides poor significance of adding a reinforcing filler, whereas the amount exceeding 250 parts by weight results in tendency to deteriorate the mold flow performance and stability in extrusion processing.

Moreover, conventional additives for resins such as for example, antioxidants, crystal nucleating agents, ultraviolet ray absorbing agents, light stabilizers, release agents, pigments, dyes, lubricants, plasticizers, dispersants, compatibility accelerators, fluorescent whitening agents, fire retardants, auxiliary flame retardant agent, and the like may be added to the polyether ether ketone or resin composition of the present invention either alone or in combination of two or more thereof.

Although the method for production of the composition of the polyether ether ketone and the reinforcing filler of the present invention is not particularly limited, a method of kneading using an extruder of uniaxial, biaxial etc. type, Plastmil, Brabender, kneader, banbury mixer, heat roll or the like may be exemplified. Of these, a biaxial extruder is preferably used since workability, and dispersibility of the reinforcing filler are superior. Illustrative kneading methods using a biaxial extruder include, for example: a kneading method which includes charging through a hopper the resin components and the reinforcing filler subjected to dry blending; a method which includes charging the resin components through a hopper, and the reinforcing filler through a side feeder; and a method which includes charging a kneaded product of the resin components and the reinforcing filler through a hopper, and further charging an additional reinforcing filler through a side feeder, and the like.

The polyether ether ketone and the resin composition of the present invention can be used after processing into a molded product. Although the processing method for obtaining a molded product is not particularly limited, for example, injection molding, in-mold molding, blow molding (hollow molding), extrusion molding (including co-extrusion molding), vacuum molding, press molding, calender molding, compression molding and the like may be included.

Typical fields of application of the molded product may include members for automobile parts, members used in processing steps of semiconductors, members for electric/electronic use, members for general use in industry, members for medical use, members for food processing, and members for use in aerospace. Specific examples of use in each field of application in connection with members for automobile parts include transmission relating members such as seal rings and thrust washers, engine peripheral members such as turbo charger funs, oil pumps, washers and impellers, as well as steering column adjusters, ball joints, sensors, oil seal parts, oil filters, damper members, plungers, clutch members, actuators, a variety of gears, valve lifters, a variety of flow regulating pistons, and the like. Examples of the member used in processing steps of semiconductors include CMP retainer rings, wafer carriers, FOUP, etching rings, gaskets, chip trays, spin chucks, wafer adsorption tables, wafer baskets, rollers, sockets, wafer retainers, tweezers for wafer transfer, arms for wafer transfers, rollers for wafer washing steps, and the like. Examples of the members for electric/electronic use include print circuit substrates, transformers, insulating films, roller units for feeding, potentiometers, speaker parts, resistors, cleaner impellers, mobile phone hinges, electric heater parts, capacitors, switches, relays, LED parts, connectors, spin chucks, bearing gauges, and the like. Examples of the members for general use in industry include screws, bolts, pipes, fasteners, meters, roller sleeves, a variety of vessels, joints, bearings, inner cables, bushes, valves, pump parts, compressor parts, separation pawls for OA, housings, and the like. Examples of the members for medical use include tools for sterilization, gas chromatography members, liquid chromatography members, artificial bone, tubes, pipings for processes, and the like. Examples of the members for food processing include disintegrators, conveyer belt chains, coatings, and the like. Examples of the members for use in aerospace include electric wire covering members, cable protection members, jet engines, interior materials of cabins, and the like.

The polyether ether ketone may be synthesized by, for example, a polymerization reaction of 4,4'-dihalobenzophenones represented by the following formula (2) and hydroquinones represented by the following formula (3) carried out in a polymerization solvent such as sulfolane or diphenyl sulfone at a temperature of approximately 200 to 400° C. in the presence of a base.

X—Ar—C(=O)—Ar—X     (2)

RO—Ar—OR     (3)

wherein, Ar may be the same or different, and represents a substituted or unsubstituted p-phenylene group; X represents a halogen atom; R is the same or different, and represents a hydrogen atom, a R'-group, a R'C(O)-group, a R'OC(O)-group, a R'$_3$Si-group, or a R'$_2$NC(O)-group, wherein R' is the same or different, and represents an alkyl group having 1 to 12 carbon atoms, an aryl group having 6 to 12 carbon atoms, or an aralkyl group having 7 to 12 carbon atoms.

Examples of the 4,4'-dihalobenzophenones represented by the formula (2) include 4,4'-difluorobenzophenone, 4,4'-dichlorobenzophenone and the like, and 4,4'-difluorobenzophenone in which Ar is an unsubstituted p-phenylene group, and X is a fluorine atom is preferred. As the hydroquinones represented by the formula (3), p-hydroquinone in which Ar is an unsubstituted p-phenylene group, and R is a hydrogen atom is preferred.

By adjusting the molar ratio of 4,4'-dihalobenzophenones (2) to hydroquinones (3), type of the group introduced to the polymer end (a halogen atom such as a fluorine atom, or —OR group such as a hydroxy group), as well as the molecular weight can be regulated. More specifically, when the number of moles of 4,4'-dihalobenzophenones (2) is greater, a halogen atom such as a fluorine atom is introduced to (probably) the end, whereas when the number of hydroquinones (3) is greater, an —OR group such as a hydroxy group is introduced to the end. In addition, as the difference of moles of both compounds is smaller (i.e., the molar ratio approximates 1:1), the molecular weight of the polymer becomes higher, while as the difference of moles is greater, the molecular weight of the polymer becomes lower. When a halogen atom such as a fluorine atom is introduced to the end, the molar ratio of both compounds is generally adjusted to be in the range of 1.1:1 to 1.0001:1. More specifically, in general, 4,4'-dihalobenzophenones (2) relative to hydroquinones (3) is present more by 0.01 to 10 mol %, preferably by 0.1 to 5 mol %, and more preferably by 0.1 to 2 mol %. On the other hand, when an —OR group such as a hydroxy group is introduced to the end, the molar ratio of both compounds is generally adjusted to be in the range of 1:1.1 to 1:1.0001. More specifically, in general, hydroquinones (3) relative to 4,4'-dihalobenzophenones (2) is present more by 0.01 to 10 mol %, preferably by 0.1 to 5 mol %, and more preferably by 0.1 to 2 mol %.

The polymerization reaction as in the foregoing is achieved by polycondensation based on a nucleophilic substitution reaction by a base. Specific examples of the aforementioned base include alkali metal carbonate such as lithium carbonate, sodium carbonate, potassium carbonate, rubidium carbonate and cesium carbonate, alkali metal hydrogen carbonate such as lithium hydrogen carbonate, sodium hydrogen carbonate, potassium hydrogen carbonate, rubidium hydrogen carbonate and cesium hydrogen carbonate, alkali metal hydroxide such as lithium hydroxide, sodium hydroxide, potassium hydroxide, rubidium hydroxide and cesium hydroxide, alkylated lithium, lithium aluminum halide, lithium diisopropylamide, lithium bis(trimethylsilyl)amide, sodium hydride, sodium alkoxide, potassium alkoxide, phosphazene base, Verkade base, and the like. Among these, one of these may be used alone, or two or more may be used in combination.

The base is generally used in an amount more than the hydroquinones (3) on molar basis, preferably more than the hydroquinones (3) by 30 mol % or less, more preferably by 10 mol % or less, and particularly preferably by 1 to 5%.

Although the aforementioned polycondensation reaction is carried out in an organic solvent, for example, sulfolane and/or diphenyl sulfone can be used as the organic solvent. The polymerization solvent may be used in an amount such that the solid content of the system becomes not greater than 90% by weight. The content is preferably not greater than 50% by weight, and more preferably 15 to 30% by weight.

Moreover, in order to remove water in the system efficiently by azeotropy, an azeotropic solvent such as benzene, toluene, xylene or chlorobenzene is preferably supplied into the reaction system.

The present reaction proceeds by heating the system. Specific reaction temperature may be not higher than reflux temperature of the system. When sulfolane is used as a polymerization solvent, the reaction temperature is usually lower than 300° C., preferably falls within the range of 200° C. to 280° C., and more preferably in the range of 230 to 260° C. When diphenyl sulfone is used as a polymerization solvent, the reaction temperature is usually not lower than 300° C., and preferably falls within the range of 320 to 340° C. By keeping such temperatures, the reaction proceeds efficiently.

The reaction time is not particularly limited, and may be predetermined ad libitum taking into consideration the desired viscosity or the molecular weight. However, the reaction time is usually not longer than 24 hrs, preferably not longer than 12 hrs, more preferably not longer than 6 hrs, and particularly preferably 1 to 3 hrs.

The polyether ether ketone having a certain molecular weight composition according to the present invention may be prepared by mixing two types of polyether ether ketones having different molecular weight. Specifically, the polyether ether ketone that exhibits a single peak in a high molecular weight range of not lower than 5,000 and lower than 2,000,000, and the polyether ether ketone that exhibits a single peak in a medium molecular weight range of not lower than 1,000 and lower than 5,000 may be mixed at a ratio such that the aforementioned weight ratio of the component (A): component (B) can be satisfied. In this case, it is necessary to select the two kinds of the polyether ether ketone used each exhibiting a single peak and having a sufficiently low content of the component (C), and the polymers produced using diphenyl sulfone as a polymerization solvent such as commercially available products manufactured by Victrex plc may be used since they exhibit a single peak, and have a low content of the component (C).

Alternatively, the polymer produced using sulfolane as a polymerization solvent satisfies the requirement for the aforementioned range of the weight ratio (A):(B); however, the content of the component (C) is high. Thus, by applying the method for the purification of the present invention described later, the content of the component (C) can be reduced to enable the polyether ether ketone of the present invention to be obtained.

Next, the method for the purification of the second aspect of the present invention is explained.

According to the method for the purification of the second aspect of the present invention, a method for the purification of a polymer material having (A) a phenyl moiety, (B) at least any one of a carbonyl moiety and a sulfone moiety, and (C) at least any one of an ether moiety and a thioether moiety, the method including:

mixing the polymer material with a water soluble aprotonic solvent at a temperature of not lower than 100° C.; mixing the resulting mixture with a solvent essentially consisting of water; and thereafter separating the polymer material from the water soluble aprotonic solvent and the solvent essentially consisting of water.

The polymer material has a repeating unit shown below, and these may be included either alone, or a combination thereof:

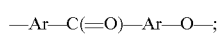

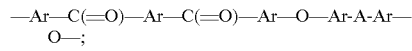

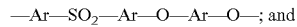

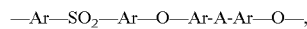

wherein, Ar may be the same or different, and represents a substituted or unsubstituted p-phenylene group.

Although the substituent on the phenyl ring is not particularly limited, for example, an alkyl group having 1 to 10 carbon atoms, an aryl group having 6 to 10 carbon atoms, an aralkyl group having 7 to 10 carbon atoms, a halogen atom, and the like may be included.

Ar included in one unit may be all the same or different, and preferably all the Ar represent(s) an unsubstituted p-phenylene group.

A represents a direct bound, an oxygen atom, a sulfur atom, —SO$_2$—, —CO—, or a divalent hydrocarbon group.

Specific types of the polymer material include, for example, polyether ether ketone, polyether ketone, polyether ketone ketone, polyether ether ketone ketone, and the like, but the second aspect of the present invention can be particularly suitably applied to polyether ether ketone. The polyether ether ketone may have the repeating unit represented by the above formula (1).

The method for production of these polymer materials is not particularly limited, and they may be produced by an electrophilic or nucleophilic reaction.

In performing the method for the purification of the second aspect of the present invention, the aforementioned polymer material is first mixed with a water soluble aprotonic solvent at a temperature of not lower than 100° C. The form of the polymer material used is not particularly limited, and may be powder, pellet, granule, or the like. Alternatively, a product which had been already molded may be also used. In addition, when a water soluble aprotonic solvent is used as a polymerization solvent of the polymer material, the reaction liquid after completing polymerization may be directly applied to the method of the present invention.

The water soluble aprotonic solvent is a solvent that is miscible with water at an arbitrary ratio, and that is aprotic. Accordingly, alcohols, as well as carboxylic acids are excluded. The mixing of the solvent and the polymer material is carried out at not lower than 100° C., and thus a solvent having a boiling point of not lower than 100° C. is selected since the solvent should be used in the liquid state in mixing. Specifically, sulfolane (boiling point: 287° C.), dimethyl sulfoxide (boiling point: 189° C.), dimethylformamide (boiling point: 153° C.), dimethylacetamide (boiling point: 166° C.), 1,3-dimethyl-2-imidazolidinone (boiling point: 224° C.), N-methylpyrrolidone (boiling point: 202° C.), and the like. One of these may be used alone, and two or more thereof may be used in combination. Above all, sulfolane is most preferred in light of efficiency of removal of impurities. It is to be noted that other high-boiling point solvent may be used in combination in the range enabling achieving the effect of the present invention.

The temperature in mixing the polymer material with the water soluble aprotonic solvent is acceptable as long as it is not lower than 100° C., but is preferably not lower than 200° C., and more preferably not lower than 250° C. since the impurities can be more efficiently removed at a higher temperature. The upper limit of the temperature is the boiling point of the solvent employed, and when, for example, sulfolane is used as the aprotonic solvent, mixing may be carried out at a temperature not higher than 287° C., i.e., the boiling point of sulfolane.

Although the pressure in mixing the polymer material and the water soluble aprotonic solvent is not particularly limited, it may be suitably carried out under a pressure of preferably lower than 10 atm, more preferably under a pressure of not lower than the ambient pressure and lower than 10 atm, and most preferably under the ambient pressure.

The amount of the water soluble aprotonic solvent used is not particularly limited, and may be determined ad libitum taking into consideration the rate of removal of the impurities. However, the amount is preferably 10 to 3,000 parts by weight, more preferably 100 to 2,000 parts by weight, and still more preferably 200 to 1,500 parts by weight based on 100 parts by weight of the polymer material. When the amount is too small, there may be a case in which impurities cannot be removed sufficiently, whereas too large amount is not preferred since a large scale of the apparatus may be required.

When the polymer material is mixed with the solvent at not lower than 100° C., a part or the entire of the polymer material tends to be dissolved in the solvent. However, it is not necessary that the entirety is dissolved homogeneously, and usually, only a part (for example, solid surface, or a part of particles) is dissolved. Even though only a part was dissolved, the effect of reducing the amount of impurities can be achieved. It is believed that the alkali metal ion incorporated in the polymer material can be thus released in the water soluble aprotonic solvent.

The aforementioned mixing may be carried out by adding the solid polymer material to the aprotonic solvent heated to a predetermined temperature of not lower than 100° C., or may be carried out by mixing the aprotonic solvent with the solid polymer material at an ordinary temperature, and thereafter heating to a predetermined temperature.

The resulting mixture is preferably kept at a predetermined temperature of not lower than 100° C. for a certain time period. This process serves in improving efficiency of removal of the impurities. Although the time of keeping is not particularly limited, it is preferably 5 min to 24 hrs, more preferably 10 min to 12 hrs, and more preferably 30 min to 6 hrs. It is preferred that the mixture be mechanically stirred during the time period of keeping.

After completing the aforementioned processing, the mixture is preferably cooled to a temperature of lower than 100° C. in relation to the step that follows. The cooling may be either forcedly carried out using any cooling apparatus, or carried out by leaving to stand at an ordinary temperature. When sulfolane is used as an aprotonic solvent, the mixture is likely to be solidified when cooled to ordinary temperatures since sulfolane has a low melting point of 27.5° C.

The mixture obtained as described above is then mixed with a solvent essentially consisting of water.

The solvent essentially consisting of water refers to a solvent substantially consisting of only water, but may contain other solvent (in particular, water soluble solvent such as methanol or ethanol) in the range enabling dissolving in the water soluble aprotonic solvent and capable of removal of the impurities. With respect to specific content of water, water accounts for preferably not less than 90% by weight, preferably not less than 95% by weight, and more preferably not less than 99% by weight of the total amount of the solvent. The solvent most preferably consists of only water. The water used in this process is preferably deionized water. It is believed that solubility of water soluble impurities such as alkali metal ions in the solvent is improved by thus mixing a solvent essentially consisting of water, whereby the purification can be carried out efficiently.

The entire amount of the solvent essentially consisting of water used is not particularly limited, and may be determined ad libitum taking into consideration the rate of removal of the impurities, but it is preferably 100 to 5,000 parts by weight, more preferably 200 to 3,000 parts by weight, and still more preferably 200 to 2,000 parts by weight based on 100 parts by weight of the mixture of the polymer material and the water soluble aprotonic solvent. The solvent essentially consisting of water may be added at once, or added after dividing into aliquots. Alternatively, a plurality of cycles of the washing step with the aprotonic solvent and the washing step with the solvent essentially consisting of water may be also carried out.

The system in which the mixture of the polymer material and the aprotonic solvent is mixed with the solvent essentially consisting of water is preferably kept at a predetermined temperature for a certain time period while stirring as needed, in order to improve the efficiency of removal of the impurities. Although the time period of keeping is not particularly limited, it is preferably 5 min to 24 hrs, more preferably 10 min to 12 hrs, and more preferably 30 min to 6 hrs. Although the predetermined temperature is not particularly limited, since keeping at a high temperature enables more efficient removal of the impurities, it is preferably not lower than 50° C., more preferably not lower than 70° C., and most preferably not lower than 100° C. In other words, it is most preferred that the mixing system described above be maintained under conditions in which water is boiling. The pressure in this system is not particularly limited, but ultrahigh pressure (for example, $6\times10^6$ Pa) will require a special pressure resistant facility; therefore, the pressure is preferably lower than 10 atm, more preferably not lower than the ambient pressure and lower than 10 atm, and still more preferably the ambient pressure, at which necessity of such a facility is avoided.

In the resultant mixing system, since the solvents are mixed and mutually blended, the liquid phase becomes substantially one phase, and the solid polymer material will be incorporated in the liquid phase.

After the resultant mixing system is cooled to a temperature suited for the processing operation, the liquid phase consisting of the water soluble aprotonic solvent and the solvent essentially consisting of water is separated from the solid phase consisting of the polymer material by, for example, filtration or the like. Then, the separated polymer material is washed with deionized water as needed, followed by drying to obtain a purified polymer material. It is to be noted that by adding water again to this polymer material, followed by heating, further higher purity can be achieved.

In the method for the purification of the second aspect of the present invention described above, a series of operations may be carried out, preferably under a pressure of lower than 10 atm, more preferably under not lower than the ambient pressure and a pressure of lower than 10 atm, and still more preferably under the ambient pressure. In this respect, the present method is very advantageous industrially, as compared with conventional methods which require use of a ultrahigh pressure and high temperature water.

The present invention is suited for removal of alkali metal ions from a polymer material, in particular, suited for removing sodium cation. The sodium cation concentration in the polymer material can be reduced to less than 25 ppm, suitably less than 20 ppm, preferably less than 15 ppm, more preferably less than 10 ppm, and particularly preferably less than 5 ppm. Moreover, in a suitable mode of the present invention, the difference between the sodium cation concentration in the polymer material before the purification and the concentration after the purification is not less than 5 ppm, and also, the sodium cation concentration in the polymer material before the purification is two times or greater the concentration after the purification.

In addition, according to the method for the purification of the second aspect of the present invention, since low molecular weight polymerization components having a molecular weight of not lower than 100 and lower than 1,000 included in a polymer material can be removed, the polyether ether ketone having a certain molecular weight composition according to the first embodiment of the present invention can be produced.

EXAMPLES

Hereinafter, the present invention is explained in more detail by way of Examples; however, the present invention is not limited to these Examples.

First Embodiment of the Present Invention

Comparative Example 1

To a three-neck reactor vessel equipped with a thermometer, a nitrogen gas inlet tube, a condensed water splitter and a stirrer were added 164 g of sulfolane (manufactured by Sumitomo Seika Chemicals Co., Ltd., Sulfolane SG), 22.04 g of 4,4'-difluorobenzophenone (0.101 mol, i.e., an amount of 1 mol % excess of the amount of hydroquinone added, 0.10 mol), 11.01 g of hydroquinone (0.100 mol), 25 g of xylene (15% by weight of the solvent). Thereafter, the mixture was stirred and heated, and 6.98 g of $K_2CO_3$ (0.0505 mol) and 5.35 g of $Na_2CO_3$ (0.0505 mol) were added thereto when the temperature was elevated to 80° C. Subsequently, the temperature was further elevated, and when the temperature was elevated to 150° C., azeotropy of the system started and xylene and water are condensed in the water splitter. Thus, reflux of xylene in the upper layer is permitted, while water in the lower layer was continuously discharged. When the water was recovered in a thoretical amount, xylene in the upper layer started to become transparent, and further xylene was subsequently distilled away from the system. Then, when the temperature of the system was continuously elevated by heating to 260° C., this temperature was kept constant. After keeping at 260° C. for 3 hrs, the heating was stopped and the mixture was stood to cool. The solid mixture obtained after cooling sufficiently was pulverized with a pulverizer, and 400 mL of ion exchanged water was added to thus resulting powder material. The mixture was boiled in a three-neck reactor vessel for 1 hour and thereafter filtrated, then rinsed with 400 mL of water. This step of boiling and filtration was repeated four times in total.

The purified powder material was dried by heating in a vacuum drying apparatus at 120° C. for 12 hrs to reduce the moisture content to lower than 0.5%, whereby a powdery polyether ether ketone was obtained.

Comparative Example 2

The procedure as in Comparative Example 1 was carried out except that the amount of 4,4'-difluorobenzophenone used was changed to 0.1015 mol (i.e., an amount of 1.5 mol % excess of the amount of hydroquinone used, 0.100 mol) to obtain a powdery polyether ether ketone.

Comparative Example 3

The procedure as in Comparative Example 1 was carried out except that the amount of 4,4'-difluorobenzophenone used was changed to 0.102 mol (i.e., an amount of 2 mol % excess of the amount of hydroquinone used, 0.100 mol) to obtain a powdery polyether ether ketone. Thus resulting polyether ether ketone had a sodium cation content of 79 ppm.

Comparative Example 4

As a control sample, Victrex PEEK 151G (trade name, manufactured by Victrex plc) was used.

Comparative Example 5

As a control sample, Victrex PEEK 450 PF (trade name, manufactured by Victrex plc) was used.

Comparative Example 6

As a control sample, Victrex PEEK 381G (trade name, manufactured by Victrex plc) was used.

Comparative Example 7

As a control sample, Victrex PEEK 90G (trade name, manufactured by Victrex plc) was used.

Comparative Example 8

As a control sample, VESTAKEEP 1000G (trade name, manufactured by Daicel-Evonik Ltd.) was used.

Comparative Example 9

As a control sample, VESTAKEEP 2000G (trade name, manufactured by Daicel-Evonik Ltd.) was used.

Comparative Example 10

As a control sample, VESTAKEEP 4000G (trade name, manufactured by Daicel-Evonik Ltd.) was used.

Example 1

To a reactor vessel equipped with a thermometer, a cooling tube and a stirrer, were added 20 g of the polyether ether ketone powder obtained in Comparative Example 1 and 180 g of dimethyl sulfoxide (DMSO), and the mixture was stirred. The temperature of the mixture was elevated to 180° C., and stirring was carried out for 2 hrs. The mixture was cooled to 60° C. and filtrated, followed by rinsing with 100 g of fresh DMSO. The foregoing step of heating at 180° C. for 2 hrs and filtration was repeated four times in total. To the reactor vessel were charged the filtrated powder resin and 140 g of ion exchanged water, and the mixture was stirred at room temperature for 1 hour, followed by filtration and rinsing with 140 g of ion exchanged water. To the reactor vessel were charged the filtrated powder resin and 100 g of acetone, and the mixture was stirred at room temperature for 1 hour, followed by filtration and rinsing with 100 g of acetone. Thus resulting powder resin was dried by heating in a vacuum drying apparatus at 120° C. for 12 hrs to reduce the moisture content to lower than 0.5%, whereby a powdery polyether ether ketone was obtained.

Example 2

The procedure as in Example 1 was carried out except that the polyether ether ketone powder obtained in Comparative Example 1 which was used in Example 1 was changed to the polyether ether ketone powder obtained in Comparative Example 2 to obtain a powdery polyether ether ketone.

Example 3

To a reactor vessel equipped with a thermometer, a cooling tube and a stirrer, were added 15 g of the polyether ether ketone powder obtained in Comparative Example 3 and 170 g of sulfolane. The mixture was heated while stirring, and when the temperature reached 260° C., the temperature was kept constant for 2 hrs. After this mixed liquid was cooled, 300 mL of water was added thereto and boiled for 1 hour, followed by cooling, filtration, and rinsing with a fresh 300 mL portion of water. The foregoing step of boiling, filtration and rinsing was repeated four times in total. The purified resin was dried by heating in a heat drying apparatus at 120° C. for 12 hrs to reduce the moisture content to lower than 0.5%, whereby a powdery polyether ether ketone was obtained. The polyether ether ketone obtained in this manner had a reduced sodium cation content of 1.9 ppm.

(Method of Measuring Solution Viscosity)

The solution viscosity was determined using Ubbelohde type viscometer, size No. 1C (capillary diameter: 0.77 mm) described in ISO1628-1: 1998, 5.1; or ISO3105: 1994, Table B4, at 25° C. by measuring efflux time on a 0.1 g/dL solution in conc. sulfuric acid and 95% conc. sulfuric acid, and substituting each measurement into the following formula:

$$\text{solution viscosity } \eta i = \ln(t/t0)/c$$

wherein, t is efflux time (sec) of the solution in 95% conc. sulfuric acid;

t0 is efflux time (sec) of 95% conc. sulfuric acid; and c is the concentration of the solution, i.e., 0.1 g/dL.

(Method of Measuring Molecular Weight)

The molecular weight distribution of each polyether ether ketone of each of Examples and Comparative Examples was determined using a GPC apparatus under the following conditions.

Apparatus: gel permeation chromatograph (GPC) PL-220 (manufactured by PL Inc.)

Detector: differential refractive index detector RI (manufactured by PL Inc.)

Column: Shodex HT-806M (manufactured by Showa Denko K.K.), two columns serially connected Solvent: o-dichlorobenzene/p-chlorophenol (volume ratio: 7/3) (manufactured by Nacalai Tesque, Inc./manufactured by Tokyo Chemical Industry Co., Ltd.)

Flow rate: 0.7 mL/min

Temperature: 80° C.

Amount of injection: 0.20 mL

In each of Examples and Comparative Examples, the calibration curve was produced using the following standard polystyrene having a molecular weight of: 500, $1.01 \times 10^3$, $2.63 \times 10^3$, $5.97 \times 10^3$, $1.81 \times 10^4$, $3.79 \times 10^4$, $9.64 \times 10^4$, $1.90 \times 10^5$, $4.27 \times 10^5$, $7.06 \times 10^5$, $1.09 \times 10^6$, and $3.84 \times 10^6$.

In each of Examples and Comparative Examples, the sample solution for GPC determination was prepared as in the following. In a flask equipped with a cooling tube were charged 0.1 g of polyether ether ketone and 10 mL of p-chlorophenol, and the mixture was stirred at 180° C. for 20 min to allow for dissolution. Next, the solution was stood to cool to room temperature. The solution in a volume of 3 mL was diluted with 7 mL of o-dichlorobenzene for use.

The distribution curves illustrating thus obtained number molecular weight distribution are shown in FIGS. 1 to 8. FIGS. 1 to 8 correspond to the results of Examples 1 to 3 and Comparative Examples 1 to 5, respectively. In this distribution curve, the weight ratio of each of the polymerization components of:

(A) polymerization component having a molecular weight of not lower than 5,000 and lower than 2,000,000;

(B) polymerization component having a molecular weight of not lower than 1,000 and lower than 5,000; and (C) polymerization component having a molecular weight of not lower than 100 and lower than 1,000 was determined according to the following method. In FIGS. 1 to 8, portions corresponding to (A), (B) and (C), respectively were cut away from the chart, and the weight of each portion was measured to execute calculation. The results are shown in Table 1.

(Production of Pellet for Evaluation)

Polyether ether ketone in an amount of 100 parts by weight was subjected to melt kneading with a co-rotation twin screw extruder having a cylinder temperature of a region from the nozzle portion to the melt portion predetermined to be 390 to 360° C. with a diameter φ of 25 mm (L/D=41). The strand discharged from the tip die was cooled in a water bath having a length of about 120 cm, and passed through a pelletizing machine to obtain an extruded pellet for evaluation. Thus obtained pellet was used in a flow performance test.

(Production of Molded Product for Evaluation)

Next, thus obtained pellet was charged into an injection molding machine having a cylinder temperature of a region from the nozzle portion to the melt portion predetermined to be 390 to 360° C. with a mold clamping force of 40 ton, and molded under a condition at a die temperature of 190° C. to form an ASTM1 dumbbell test piece (thickness: 3.1 mm). Thus obtained molded product for evaluation was used for the evaluation on tensile test, bend test, and long-term heat resistance.

(Tensile Test)

Using the ASTM1 dumbbell test piece, tensile yield strength was measured according to ASTM D638. The test speed was 5 mm/min, and a universal testing machine (manufactured by Instron: type 5582) was used as a measurement apparatus.

(Bend Test)

Using the ASTM1 dumbbell test piece, flexural strength and elastic modulus in flexure were measured according to ASTM D790. The test speed was 1.3 mm/min, and a universal testing machine (manufactured by Instron: type 5582) was used as a measurement apparatus.

(Flow Performance Test)

Using the extruded pellet, measurement was carried out according to JIS K7210, with a measurement load of 2.16 kg, preheating for 5 min, and a heating temperature of 400° C. A melt indexer (manufactured by TOYO SEIKI Co., Ltd.) was used as the measuring apparatus.

(Long-Term Heat Resistance Evaluation)

The ASTM1 dumbbell test piece was allowed to stand still for 250 hrs in an internal air circulation system dryer preset at 200° C. Thereafter, the test piece was left to cool to room temperature, and then evaluation was made by touching the surface with a finger to decide as "unfavorable" when white fine powders were attached to the finger, or as "favorable" when nothing was attached to the finger.

The results obtained as described in the foregoing are shown in Table 1 and Table 2.

TABLE 1

| | Mn (g/mol) | Mp (g/mol) | 100*A/(A+B) | 100*B/(A+B) | 100*C/(A+B+C) | Molecular weight distribution | Solution viscosity $\eta i$ (dL/g) | Flow performance (g/10 min) |
|---|---|---|---|---|---|---|---|---|
| Example 1 | 24,400 | 75,500 | 96 | 4 | 0.0 | multimodal | 0.98 | 7 |
| Example 2 | 28,200 | 64,300 | 97 | 3 | 0.0 | multimodal | — | — |
| Example 3 | 21,600 | 60,100 | 96 | 4 | 0.0 | multimodal | 0.79 | 52 |
| Comparative Example 1 | 18,600 | 67,900 | 95 | 5 | 0.5 | multimodal | 1.00 | 9 |
| Comparative Example 2 | 17,700 | 58,700 | 95 | 5 | 0.8 | multimodal | 0.89 | 17 |
| Comparative Example 3 | 16,400 | 53,000 | 94 | 6 | 0.4 | multimodal | 0.75 | 58 |
| Comparative Example 4 | 26,700 | 47,200 | 98 | 2 | 0.0 | unimodal | 0.77 | 32 |
| Comparative Example 5 | 33,100 | 58,200 | 98 | 2 | 0.0 | unimodal | 1.01 | 3 |
| Comparative Example 6 | 25,400 | 50,500 | 98 | 2 | 0.0 | unimodal | 0.92 | 4 |
| Comparative Example 7 | 17,400 | 47,200 | 95 | 5 | 0.0 | unimodal | 0.71 | 65 |
| Comparative Example 8 | 25,200 | 51,100 | 98 | 2 | 0.0 | unimodal | 0.66 | 70 |
| Comparative Example 9 | 15,700 | 55,200 | 94 | 6 | 0.8 | unimodal | 1.03 | 40 |
| Comparative Example 10 | 26,300 | 51,000 | 98 | 2 | 0.0 | unimodal | 1.14 | 5 |

TABLE 2

| | | Example 1 | Comparative Example 1 | Comparative Example 5 |
|---|---|---|---|---|
| Tensile strength | MPa | 96 | 96 | 94 |
| Flexural strength | MPa | 160 | 160 | 160 |
| Elastic modulus in flexure | GPa | 4.1 | 4.0 | 4.0 |
| Flow performance | g/10 min | 7 | 9 | 3 |
| Long-term heat resistance | | favorable | unfavorable | favorable |

From Table 1 and Table 2, since the polymer of the first embodiment of the present invention provided by Example 1 had high flow performance, it was superior in molding processability, whereas the obtained molded product had both favorable mechanical physical properties and superior thermal stability. On the other hand, although excellent flow performance was achieved in Comparative Example 1, thermal stability of the molded product was inferior. Furthermore, in Comparative Example 5, flow performance was significantly deteriorated although thermal stability of the molded product was favorable.

Second Embodiment of the Present Invention

The sodium cation concentration in the following Examples was measured with an ICP mass spectrometry (ICP-MS) assay. As a pretreatment, about 0.1 g of the sample was preciously weighed in a vessel for decomposition made of PTFE, and thereto were added ultrahigh pure sulfuric acid (manufactured by Kanto Chemical Co., Inc., Ultrapure) and ultrahigh pure nitric acid (manufactured by Kanto Chemical Co., Inc., EL grade). Acid decomposition was permitted with a microwave decomposition equipment MLS-1200 MEGA manufactured by Milestone General K.K. while pressurization. The liquid subjected to the decomposition was quantitatively taken in a volume of 50 mL, and diluted appropriately to prepare a solution for determination. Agilient 7500C (manufactured by Yokogawa Analytical Systems, Inc., equipped with ORS) was used with Co as an internal standard to determine according to an absolute calibration curve process. In order to suppress influences from molecular ions and the like which may be inhibitory, the measurement was carried out while introducing a hydrogen gas into an ORS cell of the equipment at a rate of 3.5 mL/min. In every case, the lower limit of quantitative determination of sodium cation was 0.5 ppm.

Example 4

To a separable flask equipped with a thermometer, a nitrogen gas inlet tube, a condensed water splitter and a stirrer were added 15 g of a powdery polyether ether ketone containing 150 ppm of sodium cation (Victrex PEEK 450 PF (trade name)) and 85 g of sulfolane (manufactured by Sumitomo Seika Chemicals Co., Ltd.), and the mixture was heated while stirring. When the temperature was elevated to 260° C., the temperature was kept constant for 2 hrs.

After this mixed liquid was cooled, 150 mL of water was added thereto and heated again, followed by boiling for 1 hour and cooling. Then, the resin powders were separated from the liquid phase by filtration, and thereafter the powders were washed using a fresh 150 mL portion of water. The foregoing step of boiling, filtration and washing was repeated four times in total. The aforementioned operations were all carried out under the ambient pressure. The purified resin was dried by heating in a heat drying apparatus at 120° C. for 12 hrs to reduce the moisture content to lower than 0.5%, whereby polyether ether ketone was obtained. The polyether ether ketone obtained in this manner had a reduced sodium cation content of 14 ppm.

INDUSTRIAL APPLICABILITY

According to the present invention, a polyether ether ketone which is superior in mold flow performance, mechanical physical properties, and thermal stability can be produced.

The invention claimed is:

1. A polyether ether ketone having a repeating unit represented by the following formula (1):

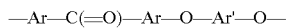　　(1)

wherein, Ar and Ar' may be the same or different, and represent a substituted or unsubstituted phenylene group, the polyether ether ketone comprising:
(A) a polymerization component having a molecular weight of not lower than 5,000 and lower than 2,000,000; and
(B) a polymerization component having a molecular weight of not lower than 1,000 and lower than 5,000, wherein:

the weight ratio of (A):(B) is 60:40 to 97:3;

the content of (C) a polymerization component having a molecular weight of not lower than 100 and lower than 1,000 is from 0 and less than 0.2% by weight based on the total weight of the component (A), the component (B) and the component (C);

the polyether ether ketone exhibits a multimodal molecular weight distribution with a maximum peak molecular weight falling within the range of not lower than 5,000 and lower than 2,000,000; and the inherent viscosity of a solution containing the polyether ether ketone in conc. sulfuric acid at a concentration of 0.1 g/dL is not less than 0.4 dL/g.

2. The polyether ether ketone according to claim 1, which exhibits a peak molecular weight in the range of not lower than 1,000 and lower than 5,000 of the molecular weight.

3. The polyether ether ketone according to claim 1, wherein the concentration of sodium cation is less than 25 ppm.

4. A resin composition comprising the polyether ether ketone according to claim 1, and a reinforcing filler.

* * * * *

UNITED STATES PATENT AND TRADEMARK OFFICE
CERTIFICATE OF CORRECTION

PATENT NO.       : 8,575,298 B2                                           Page 1 of 1
APPLICATION NO. : 12/740659
DATED            : November 5, 2013
INVENTOR(S)      : Ono et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 457 days.

Signed and Sealed this
Twenty-second Day of September, 2015

Michelle K. Lee
*Director of the United States Patent and Trademark Office*